United States Patent [19]

Das Gupta et al.

[11] 4,308,122
[45] Dec. 29, 1981

[54] APPARATUS FOR WASTE TREATMENT EQUIPMENT

[75] Inventors: Sankar Das Gupta; James K. Jacobs; Samaresh Mohanta, all of Toronto, Canada

[73] Assignee: HSA Reactors Limited, Canada

[21] Appl. No.: 100,213

[22] Filed: Dec. 4, 1979

[30] Foreign Application Priority Data

Dec. 4, 1978 [CA] Canada .................................. 317327

[51] Int. Cl.³ .................. C25B 15/08; C25B 9/02; C25B 11/03; C25B 11/10
[52] U.S. Cl. ..................................... 204/257; 204/151; 204/228; 204/279; 204/284; 204/288; 204/290 F; 204/294
[58] Field of Search ............... 204/284, 286, 294, 288, 204/290 F, 151, 252–258, 275–277, 267–269, 263–266, 279, 228; 429/34–39

[56] References Cited

U.S. PATENT DOCUMENTS

| | | | |
|---|---|---|---|
| 2,470,073 | 5/1949 | Low | 204/284 X |
| 2,563,903 | 8/1951 | Zadra | 204/272 |
| 3,287,248 | 11/1966 | Braithwaite | 204/260 |
| 3,450,622 | 6/1969 | Cothran | 204/234 |
| 3,457,152 | 7/1969 | Maloney, Jr. et al. | 204/131 |
| 3,516,916 | 6/1970 | Ackermann | 204/263 X |
| 3,650,925 | 3/1972 | Carlson | 204/284 |
| 3,676,324 | 7/1972 | Mills | 204/284 |
| 3,763,005 | 10/1973 | Butre et al. | 204/257 X |
| 3,827,964 | 8/1974 | Okubo et al. | 204/257 |
| 3,829,327 | 8/1974 | Omori et al. | 204/294 X |
| 3,946,751 | 3/1976 | Breiter et al. | 136/6 FS |
| 3,953,312 | 4/1976 | Kikkawa et al. | 204/198 |
| 3,953,313 | 4/1976 | Levenson | 204/267 |
| 3,953,313 | 4/1976 | Levenson | 204/294 X |
| 3,968,273 | 7/1976 | Kastening et al. | 427/122 |
| 4,046,663 | 9/1977 | Fleet et al. | 204/280 |
| 4,046,664 | 9/1977 | Fleet et al. | 204/280 |
| 4,108,754 | 8/1978 | Fleet et al. | 204/263 |
| 4,108,755 | 8/1978 | Fleet et al. | 204/263 |
| 4,108,757 | 8/1978 | Fleet et al. | 204/294 |
| 4,118,294 | 10/1978 | Pellegri | 204/129 |
| 4,179,350 | 12/1979 | Deborski | 204/284 |
| 4,197,181 | 4/1980 | Portal et al. | 204/283 |
| 4,210,516 | 7/1980 | Mose et al. | 204/257 X |
| 4,211,627 | 7/1980 | Cunningham | 204/254 X |
| 4,226,685 | 10/1980 | Portal et al. | 204/105 R |

FOREIGN PATENT DOCUMENTS 689482 6/1964 Canada .
51-67267 6/1976 Japan .

OTHER PUBLICATIONS

Yaniv, D. and Ariel, M., "Electrodeposition and Stripping at Graphite Cloth Electrodes", Journal of Electro Analytical Chemistry, vol. 79, pp. 159–167, (1979).

Primary Examiner—Donald R. Valentine
Attorney, Agent, or Firm—Lerner, David, Littenberg & Samuel

[57] ABSTRACT

Apparatus usable in the electrolytic treatment of electroactive species in a solution include a porous electrode which is supported across a fluid flow path in such a manner that fluid flowing along the flow path must pass through an effective portion of the electrode.

54 Claims, 8 Drawing Figures

APPARATUS FOR WASTE TREATMENT EQUIPMENT

FIELD OF THE INVENTION

The present invention relates to apparatus for electrolytically treating various electroactive species in solutions thereof, and, more particularly, to such apparatus for extracting small concentrations of metallic species from solutions, such as liquid waste waters and effluents from industrial processes, e.g., metal plating operations.

BACKGROUND OF THE INVENTION

There are, at present, a variety of so-called "electrochemical" apparatus and processes in which an input of electrical power is employed in order to bring about activity at a working electrode. These electrochemical processes and apparatus are generally employed to treat solutions, such as waste water and plant effluents, in order to reduce the concentration of metal contaminants to levels which are acceptable, particularly in view of the present stringent environmental regulations, and to recover these metal contaminants.

There are two general categories of such electrochemical processes depending on their most significant limiting factor. The first group includes processes whose reaction rates are kinetically controlled, i.e., the reaction rates are limited by the speed of the reactions at a working electrode. In these processes, the solution or electrolyte being treated contains high concentrations of electro-active species. An example of one such process is the electro-refining of zinc, where there is inherently a high concentration of zinc in the electrolyte.

The second group of electrochemical processes includes those in which the reaction rates are controlled by mass transfer considerations, rather than by kinetic requirements, i.e., the reaction rates are limited by how much of the contaminants can be brought into contact with a working electrode in a given time. In contrast to the electrodes used in kinetically controlled processes, the working electrodes used in these mass transfer controlled processes must exhibit characteristics which enhance the obtainable mass transfer rates. One such characteristic is a large surface area to volume ratio. Attempts have been made to achieve acceptable surface area to volume ratios by utilizing packed beds of fibrous or granular material (see, for example, U.S. Pat. Nos. 2,563,903; 3,450,622; 3,457,152; and 3,827,964), as well as active beds which can move in a flow of electrolyte. These attempts have suffered, however, from distinct disadvantages based primarily on the difficulty of providing a uniform and controlled electrical potential throughout the electrode to make full use of the surface area. The use of granular or fibrous beds is also disadvantageous because the electrolyte can channel around the granules or fibers, thereby bypassing the effective portion of the electrode and, consequently, deleteriously affecting the effectiveness of the electrode. Thus, two general disadvantages of the prior art mass transfer controlled processes are low current efficiency and low conversion completeness. As a result of these major drawbacks, none of the prior art mass transfer controlled processes has achieved significant acceptance.

In both the kinetically controlled processes and the mass transfer controlled processes, one of the prime considerations is the method of recovering the electroactive material removed from the electrolyte and deposited on a working electrode. It is generally necessary to conduct a stripping operation to remove the deposited material from the working electrode prior to the subsequent use thereof. The working electrodes used in these processes are sometimes made from the same material that is to be stripped therefrom, so that the resulting product can be used directly. More commonly, however, these electrodes are designed for mechanical stripping. In addition, in other cases, the electrode must meet other requirements, such as those described in U.S. Pat. No. 3,953,312, where the prime consideration is that the electrode be combustible so that silver deposited on the electrode can be recovered by melting during combustion.

More recently electrodes and reactors have been developed which employ carbon fibers in a manner so as to both provide a large surface area to volume ratio and at the same time limit fluctuations in the electrical potential throughout the electrode. Such electrodes and reactors are described, for example, in U.S. Pat. Nos. 4,046,663; 4,046,664; 4,108,754; 4,108,755; and 4,108,757. These electrodes and reactors suffer, however, from the same channeling and bypass problems which plaque the granular or fibrous bed electrodes described above.

Carbon fiber electrodes and reactors therefor have also been proposed, at least on a laboratory scale, by D. Yaniv and M. Ariel in an article appearing in the Journal of Electroanalytical Chemistry, Volume 79 (1977), pages 159 to 167. The structure disclosed in this article includes an electrode of graphite cloth positioned in a frame defining an opening having an area of 2.4 cm². The article states that the results obtained confirm the feasibility of exploiting graphite cloth as a practical electrode material suited for flow-through configurations. However, the article goes on to indicate that, although the laboratory reactor worked well, it would be necessary to undertake further work to optimize a reactor using a graphite cloth electrode.

A more recent approach to an electrode for use in mass transfer controlled environments, such as in connection with dilute electrolyte solutions, is disclosed in Japanese Patent No. 67267/76 which was published on June 10, 1976 and assigned to Mitsui Petrochemical Industries Ltd. This patent discloses the use of a porous carbon electrode in connection with an electrode base material which the patent discloses can be any one of a number of well-known electrode materials, such as platinum, iron, copper, nickel, silver, lead and certain alloys thereof. The patent also discloses the use of carbon fibers in various forms, such as cloths, fabrics, felts and carbon fiber papers, to cover a base material in the form of a plate, tube, mesh or plate with holes therein. Furthermore, in Example 1 of this patent, the cathode employed comprises a titanium plate which is plated with platinum and then covered with a layer of carbon fiber fabric. Thus, in effect, a platinum cathode is provided. This patent does not deal with the question of how metals can be recovered from such electrodes so that the concentration of metallic ions can be reduced to extremely low levels in real time in an economical manner.

SUMMARY OF THE INVENTION

In accordance with the present invention, there is provided new and improved apparatus for waste treatment equipment. The apparatus are especially effective in practicing mass transfer controlled electrochemical processes.

One aspect of the invention involves a thin porous electrode having a substantially uniform pore distribution which is unchanged by fluid flow through the electrode, thereby preventing fluid flowing through the electrode from making undesired channels therein. A support, such as a frame, positions the electrode across a fluid flow path. All edges of the electrode are sealed by the support so that fluid flowing along the flow path must pass through an effective portion of the electrode, thereby preventing the fluid from channeling around or bypassing the electrode. By such a construction, substantially all of the fluid flowing through the electrode can be forced to pass within a predetermined distance of its effective portion by properly selecting the size and distribution of the pores. The effectiveness of the electrode is dependent upon its ability to permit fluid to pass in close proximity, for example, 100 $\mu$m, to its effective portion.

For a portion of the electrode to be effective, the electric potential difference between the effective portion of the electrode and electrolyte in the immediate vicinity of the effective portion must be greater than or at least equal to a measured value which varies from reaction to reaction. Competitive side-reactions, such as the kinetically controlled hydrogen or oxygen evolution reactions in aqueous media or the oxygen reduction reaction, can often occur in portions of the electrode which are ineffective in promoting the desired mass transfer controlled reactions. It has been found that a useful empirical effectiveness of the various portions of a porous electrode can be obtained by promoting a reaction which results in the reversible deposition of a reaction product at a reaction site of the electrode. In particular, reduction of copper ions to copper metal from a very dilute acidic copper sulphate solution is a good tracer for determining the relative effectiveness of various portions of an electrode constructed in accordance with the present invention.

Space-time yields are standard indicators of the performance of a heterogeneous catalytic reactor. In electrochemical engineering a convenient parameter is the amount of current carried by an electrode at high current efficiencies per unit volume of that electrode. This comparative measure of electrode efficiency can be used with a given electroactive species having a known concentration and conductivity. For a copper solution having a concentration of 640 p.p.m. at a current efficiency of 52% the following space-time yields were obtained for the various electrodes shown below:

| Reactor Type | Space-Time yield mA/cm$^3$ |
| --- | --- |
| Restrained Packed Bed | 57 |
| Fluidized Bed | 4 to 60 |
| Filter Press, Capillary gap systems etc. | 1 or less |
| Present electrode | Greater than 1280 |

It should also be noted that at increased flow velocities electrodes constructed in accordance with the present invention have demonstrated space-time yield results as high as 6800 mA/cm$^3$ and at very low flow rates space-time yields have been recorded in the range of 500 mA/cm$^3$. Thus, the present electrode is much more effective than any of the prior electrodes, such as those disclosed in, for example, U.S. Pat. Nos. 3,450,622; 3,457,152; 3,953,313; 4,046,663; and 4,108,755.

Another aspect of the invention involves a cell which utilizes the above-described electrode as a first electrode. The cell may further include a second electrode, which is positioned on one side of the first electrode, and a third electrode positioned on the other side of the first electrode. A first inlet is in fluid communication with a first chamber positioned between the first and second electrodes, so that fluid can be supplied to the first chamber through the first inlet. A second chamber, positioned between the first and third electrodes, communicates with a first outlet, whereby fluid can be discharged from the second chamber through the first outlet. By this arrangement, fluid flowing from the first inlet to the first outlet flows through the first electrode in a first direction.

A second outlet and a second inlet may be provided in fluid communication with the first and second chambers, respectively, so that fluid can flow through the first electrode in a second direction opposite the first direction. Thus, upon termination of flow of a first fluid, such as waste water, in the first direction, the first electrode can be back flushed, for stripping and cleaning purposes, by the reverse flow of a second fluid, such as a suitable stripping electrolyte, through the first electrode in the second direction. Inasmuch as the first electrode is preferably thin, e.g., about $\frac{1}{4}$–15 millimeters thick, back flushing of the electrode can be especially effective in removing particulate matter, such as dirt, sand and insoluble foreign material, which has been previously deposited on the electrode. In thicker electrodes, such particulate matter becomes entrapped deep in the electrodes where back flushing is generally ineffective in dislodging and removing it.

In one embodiment of the cell, the first and second inlets and the first and second outlets are formed in the support for the first electrode. The cell can be made more compact by forming these inlets and outlets in the support.

The first chamber may be delimited by a first diaphragm disposed between the first and second electrodes and cooperating with the second electrode to delimit a third chamber. Similarly, a second diaphragm can be disposed between the second and third electrodes to delimit the second chamber and a fourth chamber, positioned between the second diaphragm and the third electrode. By this arrangement, a third fluid, such as a suitable anolyte, may be supplied to the third and fourth chambers through third and fourth inlets, respectively. Fluid supplied to the third and fourth chambers can be discharged therefrom through third and fourth outlets, respectively.

The first electrode can be designed so that it normally operates as a cathode onto which metallic species are plated. The second and third electrodes normally operate as anodes. By changing the polarity of the first, second, and third electrodes, the second and third electrodes can operate as cathodes, while the first electrode operates as an anode for stripping the plated metallic species therefrom. When the first electrode operates as a cathode in the embodiment described in the preceding paragraph, waste water flowing from the first inlet to the first outlet flows through the first electrode, while anolyte flows through the third and fourth chambers. No electrolyte is permitted to flow into the second chamber through the second inlet as long as the waste water continues to be supplied to the first chamber and, hence, the second chamber. When the flow of the waste water through the first and second chambers ceases, the first electrode can operate as an anode by permitting the electrolyte to flow through the first and second chambers, while a catholyte flows through the third and fourth chambers, whereby the plated metallic ionic species is mechanically and electrochemically removed from the first electrode.

A plurality of the above-described cells can be combined to form a reactor in accordance with the present invention. The reactor can, therefore, be adapted to receive three different fluids, all of which are transported through the reactor.

BRIEF DESCRIPTION OF THE DRAWINGS

For a more complete understanding of the present invention, reference may be had to the following description of the exemplary embodiments, considered in conjunction with the accompanying figures of the drawings, in which.

DESCRIPTION OF EXEMPLARY EMBODIMENTS

Figure 1:
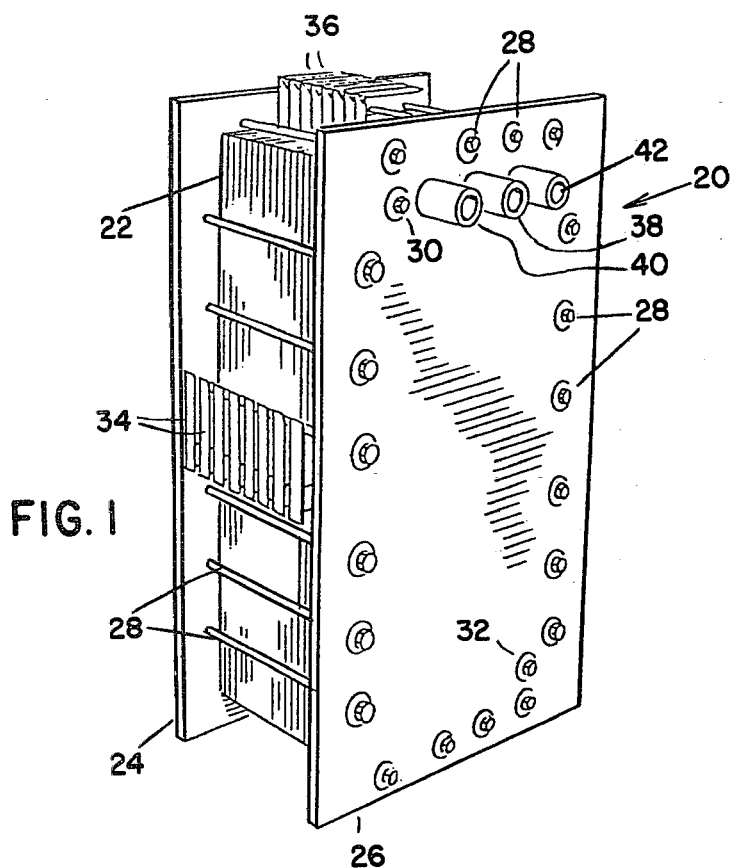
FIG. 1 is a front perspective view of a reactor produced from a number of electrochemical cells constructed in accordance with the present invention.

By utilizing the present invention it is now possible, for example, to recycle all or a major portion of a treated solution continuously so as to effectively eliminate the need to discharge effluent, such as in plant processes, waste water treatment and the like. Because of the economics of the present invention, as well as its extreme reliability, it is possible to conduct such closed cycle treatments while, at the same time, substantially avoiding the need to suspend the process in order to service or repair the treatment facility. This can be accomplished in accordance with the present invention by using polarity reversal in such electrochemical processes. At the same time, it is also possible to now reduce the concentration of metal contamination in dilute streams to levels which are acceptable in terms of the most stringent environmental regulations presently in effect.

Polarity reversal itself has primarily been used in various forms. No practical system has previously been developed, however, which lends itself both to continuous cyclic operation in a mass transfer controlled process and at the same time avoids significant electrode damage during the stripping cycle. In the past, when such processes employing polarity reversal have been contemplated, significant problems have arisen from the fact that during anodic operation the electrode itself becomes subject to attack and, in fact, can simply dissolve. Thus, with electrodes of the type disclosed in the aforementioned Japanese Patent No. 62767/76, for example, the electrode base material, or so-called "feeder", as well as the carbon fibers themselves, would be subject to such attack during the anodic stripping cycle. While the feeder or electrode base material can be made of platinum or metal coated with platinum (such as is disclosed in the aforesaid Japanese patent) to thus avoid degradation thereof, this approach is not only quite expensive but in no way solves the problem of anodic attack upon the carbon fibers themselves. This anodic attack is basically the result of the production of anodic gases during stripping.

The metals employed in connection with a secondary electrode component of the present invention, however, have a number of unexpected advantages in this regard. For example, it has been discovered that during the stripping cycle when these electrodes are operating as anodes, nonconductive substances are formed before significant amounts of corrosive agents are produced. It is therefore possible to sense termination of the stripping operation and thus prevent attack on a primary electrode component or carbon fibers by sensing a drop in current in the anode caused by the presence of this nonconductive material. Even more significant, however, is the discovery that upon further reversal of the polarity of these electrodes so that they operate again as cathodes, the secondary electrode component again becomes conductive and normal cathodic operation can continue just as before.

The exact nature of the nonconductive coatings formed in connection with the metals employed as the secondary electrode component of the present invention during their use as an anode is not entirely understood. In the case of titanium, for example, it appears that a resistive oxide coating is produced during anodic operation. However, chemically induced oxide coatings of titanium are sufficiently resistive so as to prevent their use as a cathode. These oxide coatings produced in accordance with the present invention, however, are quickly reduced during subsequent cathodic use, and it must therefore be presumed that although the electrochemically induced coatings which are formed on the titanium component are most probably oxides, they must nevertheless somehow be different from chemically induced titanium oxide coatings. While not wishing to be bound by any particular theory, it appears that a hydrated form of titanium dioxide is formed in connection with the present invention, and that this is a reversible form of titanium dioxide which is reduced during subsequent cathodic operation.

As for the primary electrode component of the present invention, this comprises a highly porous conductive material which is in electrical contact with the aforementioned secondary electrode component. Most preferred are the various forms of carbon fibers discussed above. These carbon fibers must meet certain requirements in order to be useful in mass transfer controlled processes. Thus, they must provide substantially continuous electrical conductivity throughout the electrode in order to minimize voltage and current variations. Further, the surface area of this porous conductive material should be available to the electrolyte and the material must thus have a maximum surface area to volume ratio so as to provide a high percentage of usable surface area. Preferably such ratio should exceed about 100 cm²/cm³.

In addition, the overall flow path which exists within the porous conductive material is quite significant. There must be a minimum of blind or dead end passages in the flow through the electrode structure, again to provide contact for the solution being treated. In connection with carbon fibers, for example, ideally the pores between the fibers will define tortuous paths through the electrode in order to minimize laminar flow and to encourage the break-up of boundary layers around the surfaces. The average pore size, which is of course related to voidage, should be in the range of from about 0.1 to 3000 μm and the voidage should be in the range of from about 30 to 99% of the total volume of the electrode. These figures are also related to the pore size distribution, and it has been found that about 80% of the pores should lie within the range of from about 1 to 100 μm.

When a fibrous material is used as the porous conductive material, it is necessary to restrain the fibers within the electrode. In some cases, the fibers are similar to yarn rather than thread, so that each fiber is made up of many smaller fibers. An example of a suitable material would be a woven cloth made up of carbon fiber yarn which is spun quite loosely but woven quite tightly. As a result, larger spaces between adjacent yarns will be minimized while the elements or fibers themselves which make up the yarn are free to move slightly in the flow of electrolyte while being restrained enough to maintain the pore size required as well as the necessary pore size distribution.

Reference is next made to the drawings, in which FIG. 1 shows a reactor 20 which includes a plurality of individual cells 22 arranged for operation in parallel between a pair of end plates 24, 26. Bolts 28 restrain the cells 22 between the end plates 24, 26. The parts used to make up each of the cells are aligned by a pair of bolts 30, 32 which pass through the parts in a manner to be explained hereinbelow. For the purposes of this description the reactor 20 will be described in the position shown in FIG. 1, but it is understood that it can be used in a number of different orientations.

Electrical connection to the individual cells 22 is made through electrically conductive bars 34 provided at both sides of the reactor (one side being shown in FIG. 1) and by electrically conductive bars 36 provided at the top of the reactor. As will be described more fully with reference to FIG. 2, an electrolyte solution to be treated, such as waste water, is fed from behind and at the bottom of the reactor as shown in FIG. 1 and exits by way of outlet 38. Anolyte is also fed from the bottom of the reactor, and exits through another outlet 40. These outlets are used during the plating or metal removing cycle. Afterwards, when deposits on a working electrode, which during any such plating operation acts as a cathode, are to be stripped, the flow of waste water ceases and is replaced by a flow of a suitable electrolyte, which again enters from the bottom and behind the reactor and, in this case, exits through outlet 42. As will become evident from the description below, the electrolyte is made to back flush through the working electrode, which during any such stripping operation acts as an anode, to provide some mechanical cleaning action as well as an electrochemical removal of the plated metal.

Figures 2, 3:
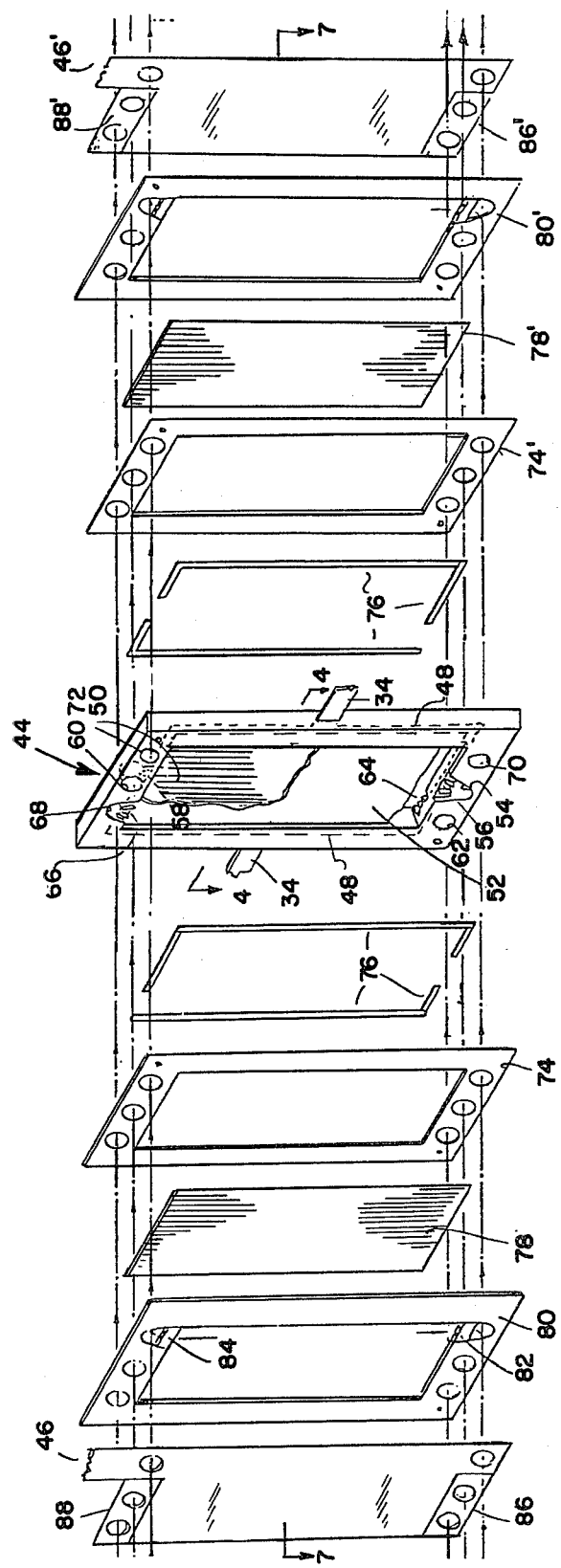
FIG. 2 is an exploded perspective view of a portion of the reactor shown in FIG. 1.
FIG. 3 is a partially broken away front perspective view of a flow divider employed in connection with the reactor of FIG. 1.

Reference is next made to FIG. 2 to illustrate some of the mechanical details of the reactor shown in FIG. 1, and, in particular, parts which make up the individual cells. As seen in FIG. 2, a frame 44 is positioned for electrochemical action relative to adjacent sides of lead counter electrodes 46, 46'. In effect, a complete cell consists of the parts shown in FIG. 2, although only the sides of the counter electrodes 46, 46' facing the frame 44 are active in that cell. Opposite sides of the counter electrodes 46, 46' are active in adjacent cells, except at the ends of the reactor where sides of the corresponding counter electrodes adjacent the end plates 24, 26 (see FIG. 1) will be insulated from these end plates and have no electrochemical effect.

Figure 4:
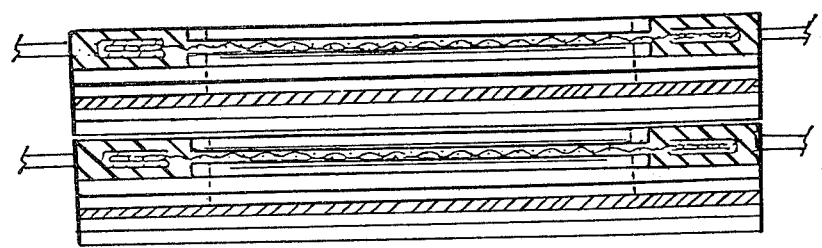
FIG. 4 is a partial horizontal, cross-sectional view of the reactor illustrated in FIG. 1.

The frame 44 is made from molded polyurethane and contains peripheral conductors 48 which grip a conductive mesh 50 made up of interwoven titanium wires as can best be seen in FIG. 4. The peripheral conductors 48 are attached to the bars 34 to ensure good electrical continuity from the bars 34 to the mesh 50.

The mesh 50 forms a secondary electrode component of the working electrode, and two primary electrode components are attached to either side of the mesh 50 to form the working electrode. One primary electrode component can be seen in FIG. 2, and consists of a sheet 52 of carbon fiber cloth of the type known as Morganite 7401 G and sold by Morganite Modmor Ltd. of England. This sheet 52 is laid in surface-to-surface contact with the mesh 50, and is held in place by a series of titanium wire staples similar to those used in conventional stapling equipment. The staples are not shown in the drawings, but are distributed over the sheet 52 where needed to hold the sheet in place. As will be described more fully below, the edges of the sheets 52 are restrained by pressing them against the mesh 50.

The working electrode can have a total thickness in the range of from about ¼ mm to about 15 mm. In one particular embodiment, the mesh has a thickness of about 1 mm and each of the sheets 52 has a thickness in the range of from about 1 mm to about 2 mm.

The frame 44 also includes a series of top and bottom openings to transport liquids as indicated with reference to the outlets 40, 42 and 38 shown in FIG. 1. For instance, waste water to be treated enters through central bottom opening 54, and a portion thereof is distributed by one of a number of inlets 56 into a space bordered on one side by an adjacent one of the sheets 52, so that the waste water flows through the working electrode to an opposite side thereof, from which it exits through one of a number of outlets 58 associated with central top opening 60, and eventually leaves the reactor through the outlet 38 (see FIG. 1). This flow takes place during the treatment of waste water (i.e., with the working electrode operating as a cathode) in order to remove metallic ionic species from the electrolyte solution.

When it then becomes necessary to strip the deposited metal from the primay electrode components or sheets 52 of the working electrode, the flow of waste water is discontinued and a stripping electrolyte is made to flow through the working electrode (which will now operate as an anode by reversing the polarity of the working electrode and the counter electrodes). This electrolyte enters through bottom opening 62 and a number of inlets 64, and leaves by way of one of a number of top outlets 66 associated with top opening 68, before finally exiting from the outlet 42 (see FIG. 1). In this case, the flow is thus again through the working electrode, but in the opposite direction to that of the waste water during the preceding cathodic operation, so as to enhance the flushing action of the stripping electrolyte.

The frame 44 further includes bottom opening 70 and top opening 72, both of which are used for anolyte. These openings simply provide passage through the frame 44. In addition, two small openings 71, 73 are provided for receiving the bolts 30, 32 (see FIG. 1) in order to align the parts.

A flow chamber for the electrolyte solution, such as waste water, is defined on the inlet side of the working electrode by space within the frame 44 itself as well as by a neoprene gasket 74 adjacent the face of the frame 44, as can be seen in FIG. 4. Openings in the gasket 74 are provided in alignment with the openings described with reference to the frame 44, and spacer strips 76 are compressed between an adjacent surface of the gasket 74 and the face of an adjacent one of the sheets 52 at the periphery of the sheet. These strips 76 ensure that the edges of the sheets 52 are held tightly against the mesh 50. The inlet chamber is completed by a diaphragm 78 nipped between the gasket 74 and a further neoprene gasket 80, which has openings in alignment with the openings described with reference to the frame 44. A similar outlet chamber is provided by similar parts labelled correspondingly using primed reference numerals.

The gasket 80 also provides access for anolyte into a flow chamber defined, in part, by the gasket 80, as well as by the diaphragm 78 and the counter electrode 46. The assembled arrangement is better seen in FIG. 4. The flow of anolyte is facilitated by a pair of molded flow diverters 82, 84 made of polyurethane and arranged to fit in the gasket 80. One such diverter is shown in FIG. 3. Diverters 82, 84 ensure access of anolyte into the flow chamber adjacent the counter electrode 46 so as to obtain electrochemical continuity between the adjacent surface of the anode 46 and the working electrode contained in the frame 44. A pair of small neoprene gaskets 86, 88 is positioned adjacent the counter electrode 46 in order to compensate for the thickness of the counter electrode 46 in the assembly, and to allow the flow of waste water and electrolyte therethrough. Openings in the counter electrode 46 permit the flow of anolyte therethrough.

The parts described to the left of the frame 44 as shown in FIG. 2 are also duplicated to the right thereof, and as mentioned are indicated using primed reference numerals. Apart from the fact that the spacer strips 76' are slightly different because of the arrangement of inlets and outlets in the frame 44, the parts to the right are identical to those described on the left of the frame 44.

It will be evident from the foregoing description that each working electrode is associated with two counter electrodes, and that the parts are arranged to define a housing having a waste water flow path through the working electrode. Also, during the stripping cycle, the flow passes through the working electrode in the opposite direction. Electrical distribution is maintained in the working electrode by a combination of the mesh 50 and the natural conductivity of the two sheets 52. Because the flow is through the working electrode, the mesh 50 should have sufficient strength to resist flow forces and to prevent any significant distortion. Also, to ensure electrical continuity, the staples used to locate the sheets on the screen should be tight enough to ensure surface-to-surface contact between the sheets 52 and the mesh 50.

Figure 5:
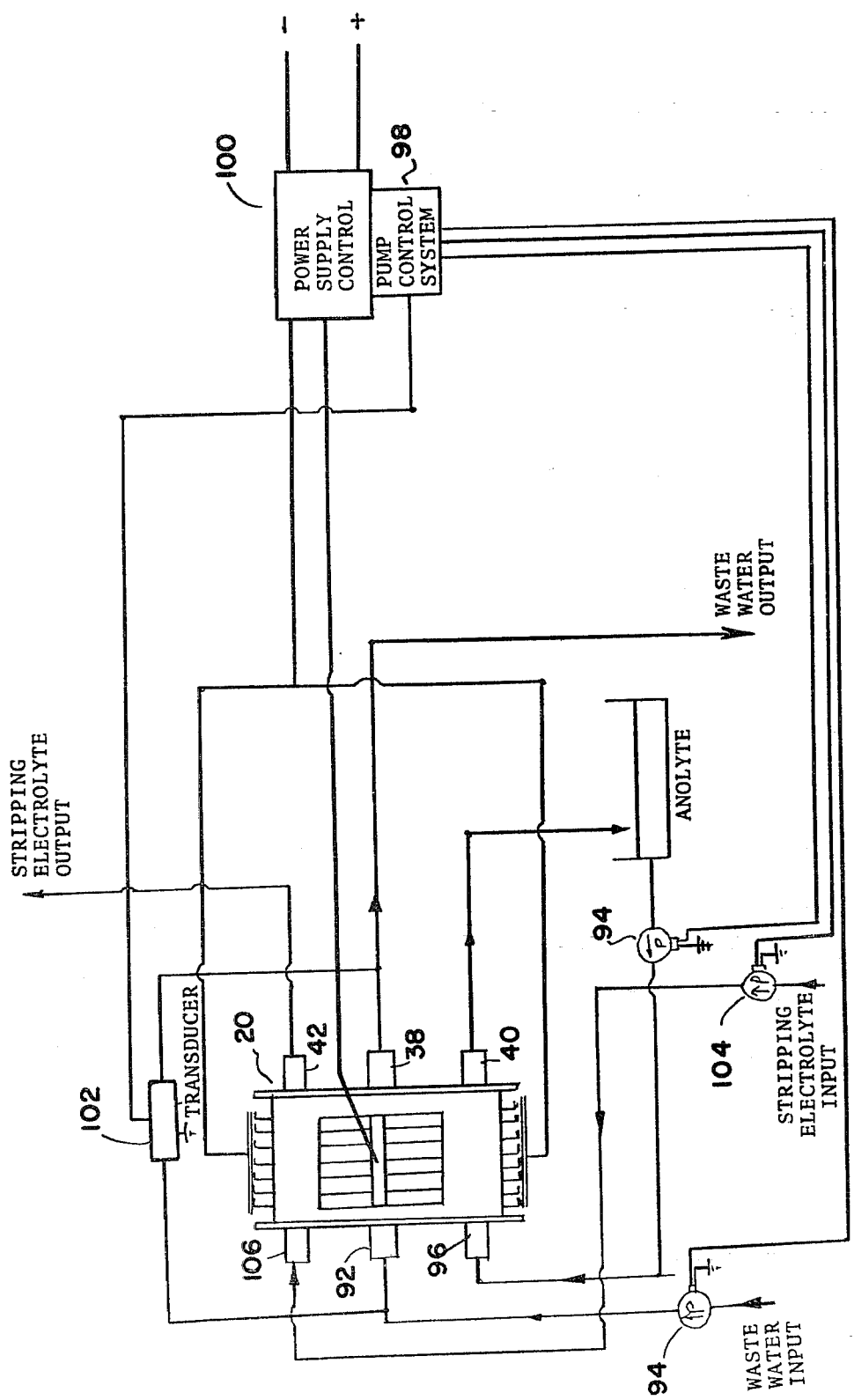
FIG. 5 is a schematic representation of a process employing the reactor of the present invention.

Reference is next made to FIG. 5, which shows the reactor in use in a typical installation. In practice, a number of these reactors could be used in parallel, or possibly in series, with as many reactors as may be necessary in order to accommodate the volume of effluent being treated. As seen in FIG. 5, the reactor 20 receives waste water from a pump 90 by way of inlet 92, and treated waste water leaves by the outlet 38. While waste water is being thus fed to the reactor, anolyte is being driven in a closed loop by pump 94 through inlet 96, to return from the reactor by way of the outlet 40. The flow of waste water and anolyte is controlled electrically by a pump control system 98 associated with a power supply control 100, which normally maintains the current at a predetermined level related to the voltage requirement. After the working electrode has been plated for some time, the pressure drop between the inlet 92 and the outlet 38 will change and this is monitored and a signal fed to the pump control system by way of transducer 102. Once the pressure drop reaches a predetermined value, the pump control system isolates power from the pump 90 and causes the power supply control 100 to reverse the polarity of the working electrode and the counter electrodes for stripping. At the same time, pump 104 is energized to feed stripping electrolyte into an inlet 106 in order to back flush the working electrode (now operating as an anode), and the stripping electrolyte exits by way of outlet 42, carrying with it a concentrated solution of the metal being stripped from the waste water. The stripping cycle continues until the voltage drop across the reactor increases significantly, as caused by the formation of the highly resistive coating on the secondary electrode component of the working electrode, as is discussed in detail above. The power supply control 100 senses this increase in voltage and again causes reversal of the polarity of the working electrode and the counter electrodes, at the same time causing the control system to re-energize the pump 90, and isolate pump 104. The coating on the secondary electrode component of the working electrode (again now operating as a cathode) is then electro-reduced, and the working electrode is again used to plate metal from the waste water. The cycle can be repeated continuously and automatically.

The pump 94 which drives the anolyte is also connected to the pump control system. Consequently, in case of emergency, the pump control system can be used to switch off this and the other pumps, while at the same time disengaging the power used to drive the reactor.

The apparatus shown diagrammatically in FIG. 5 is particularly useful in stripping nickel from waste water. When treating nickel, for example, the anolyte can be a mixture of sulphuric acid and sodium sulphate, with an additive of lactic acid. Although the anolyte will become contaminated, it has been found that significant working life can be achieved using this arrangement with a very small usage of anolyte.

Figure 6:
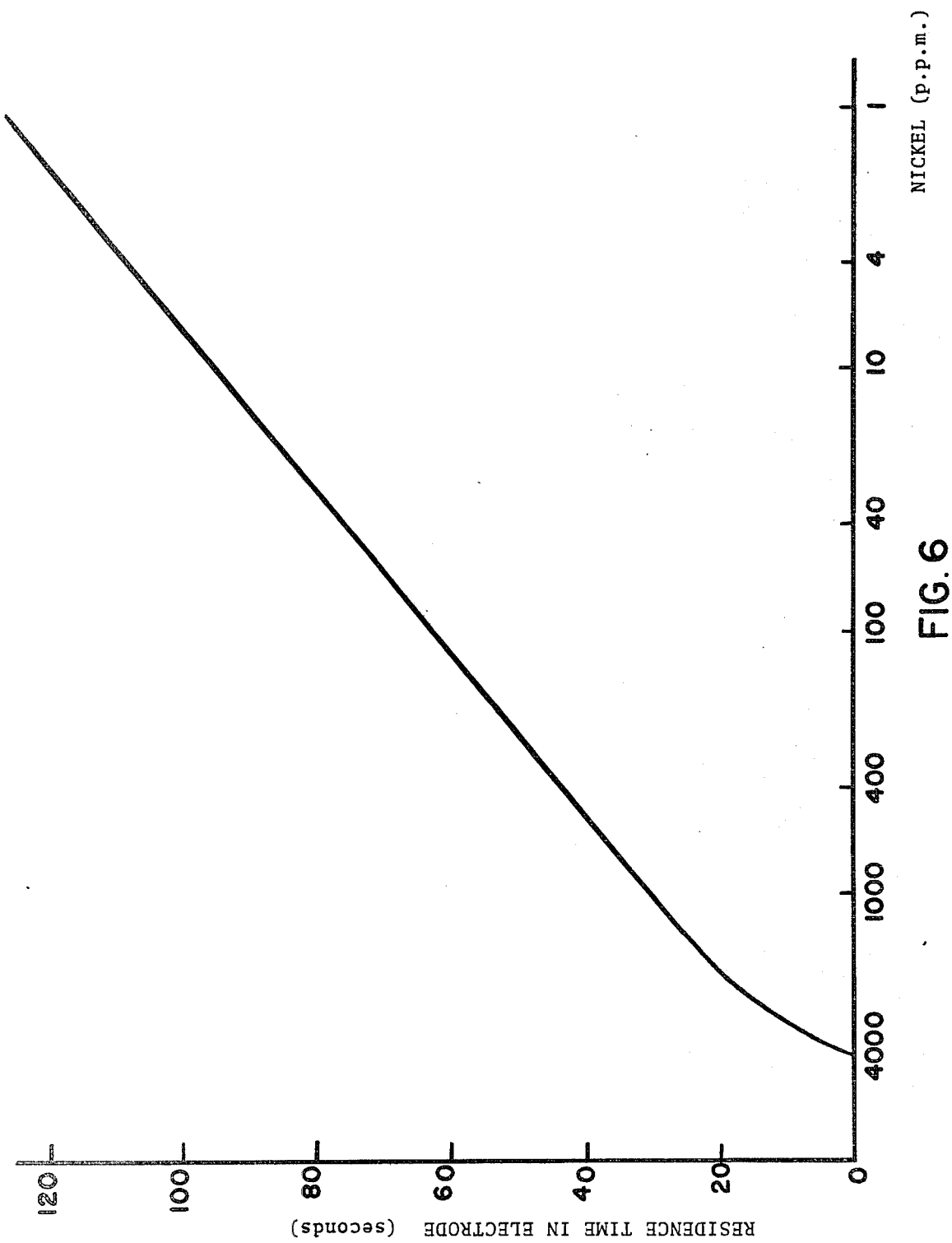
FIG. 6 is a graphical representation of results obtained employing the reactor of the present invention.
Figure 7:
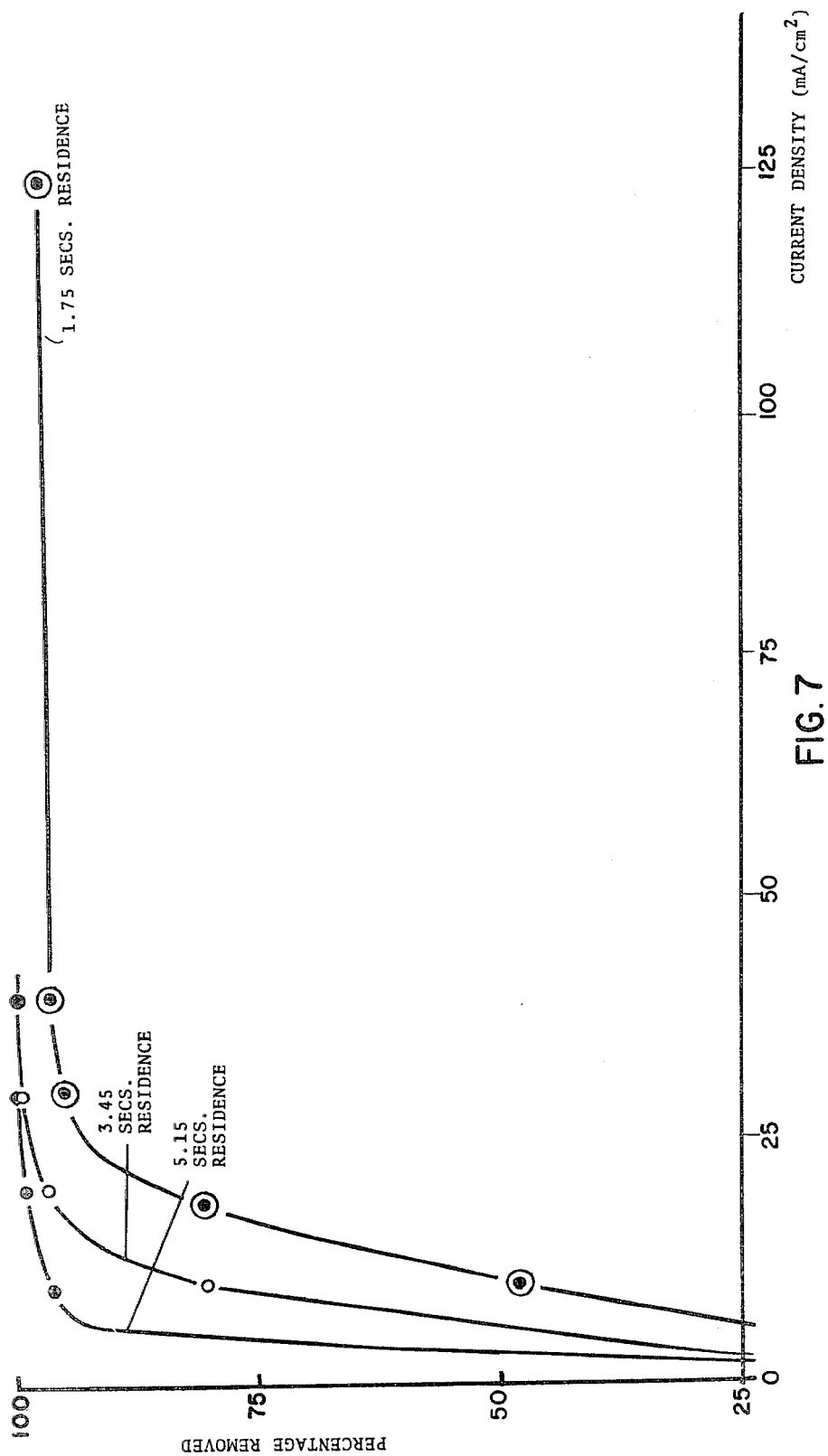
FIG. 7 is a graphical representation of further results obtained employing the reactor of the present invention.
Figure 8:
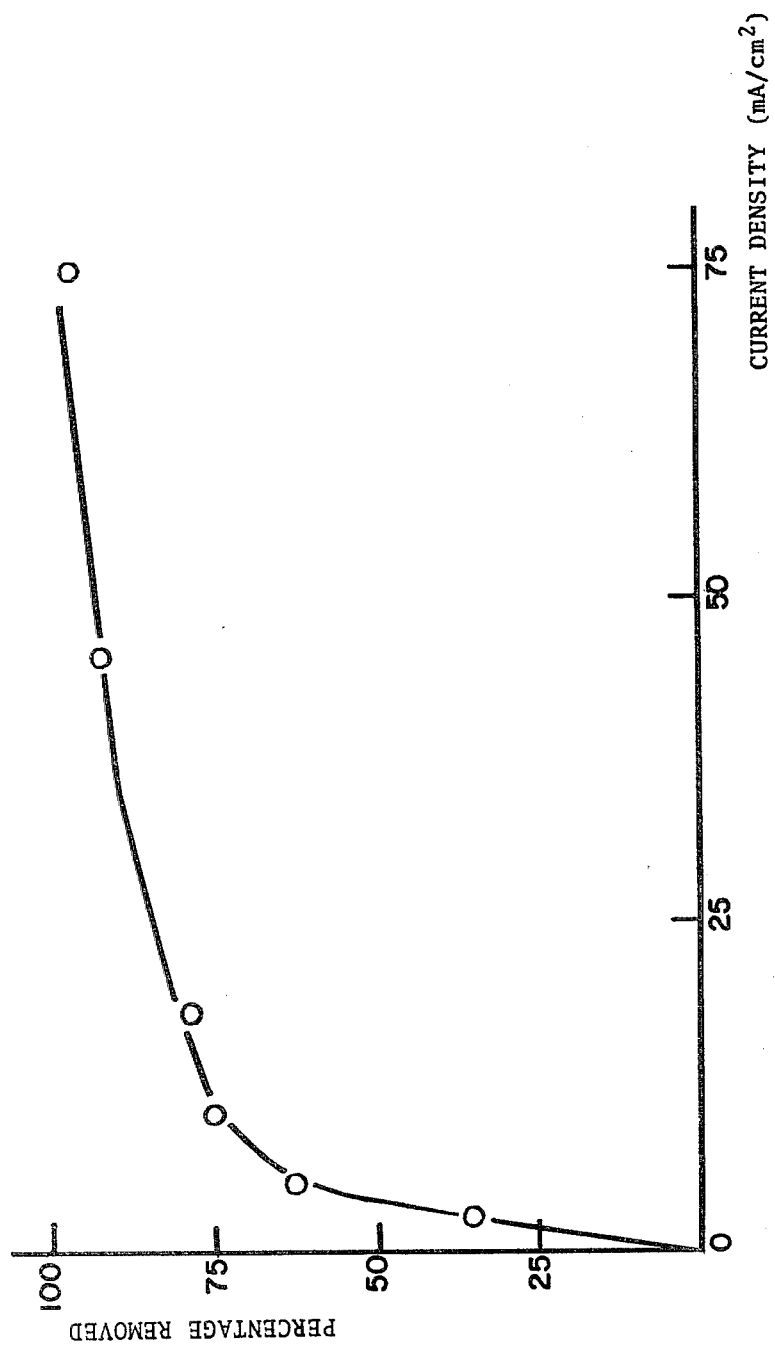
FIG. 8 is a graphical representation of still further results obtained using the reactor of the present invention.

The power supply control described above can thus maintain a constant current and sense a significant rise in voltage when the secondary electrode component of the working electrode becomes coated. If preferred, a voltage control can be used, and a sudden decrease in the current required can thus be used as a trigger. The system can also be controlled by either setting the voltage and monitoring the current requirements or by setting the current and monitoring the voltage requirements. FIGS. 6 to 8 illustrate some of the results obtainable with apparatus of the type described. FIG. 6 thus illustrates the results obtained using a working electrode having 79% voidage, an average pore size of 18 μm, a pore size distribution of 98% in the range of from 1 to 100 μm and a surface area to volume ratio of 5,600 cm²/cm³. As can be seen from FIG. 6, the initial nickel content of the waste water was 4,000 parts per million (p.p.m.). After twenty seconds, that concentration had diminished to about 2,000 p.p.m., and subsequently concentrations down to 1 p.p.m. were obtained in about 120 seconds. Such small residence times make the present process reasonably viable for use in a real time environment. This is an extremely important consideration in any commercial process, particularly where the treatment is made necessary by legislation and does not add to the quality of the finished product being made by a given commercial process.

Comparable results to those shown in FIG. 6 are shown in FIG. 7 for the removal of copper from a solution thereof. In this case, it can be seen that for very short fixed residence times of 1.75, 3.45 and 5.15 seconds, the percentage of copper removed from solution approached 100% using current densities below about 50 mA/cm². In all of these examples, the feed stream had a copper concentration of about 180 p.p.m.

Further comparable results for the removal of zinc from solution are shown in FIG. 8. In this case, the feed contained 10 p.p.m. zinc, and the residence time was again very short, in this case 3 seconds. It can be seen that in this case the percentage of zinc removed approached 100% when current densities of below 75 mA/cm² were used. It has been found that this completeness conversion of almost 100% can only be obtained by preventing the solution from bypassing the electrode, either by passing around it or through a relatively ineffective portion thereof.

FIGS. 6 to 8 thus demonstrate some of the results which can be achieved using the present reactor and cell therefor. After the materials have been removed from the waste water, they can thus be quickly stripped from the working electrode, using a suitable electrolyte. This yields an output containing a high concentration of the metal being removed. This output can be either used in other processes, or can itself be stripped electrochemically using a kinetically controlled system. Because the concentrations of this output can be very high, the efficiency of the kinetically controlled system provides no difficulty.

It will be understood by those skilled in the art that the above-described embodiments are meant to be merely exemplary and that they are, therefore, susceptible to modification and variation without departing from the spirit and scope of the invention. For instance, the flow arrangement can be varied and in general, particularly if the effects of the secondary electrode component are of paramount importance, any suitable conductive medium can be used in place of a carbon fiber cloth. Also, the secondary electrode component can be a perforated sheet instead of the mesh shown in the apparatus illustrated in the figures. Thus, the invention is not deemed to be limited except as defined in the appended claims.

What is claimed is:

1. Apparatus usable in the electrolytic treatment of electroactive species in a solution, comprising a first electrode, said first electrode being fluid permeable so that a fluid may pass therethrough; supporting means surrounding all edges of said first electrode for supporting said first electrode across a fluid flow path and sealing said edges so that fluid flowing along said flow path must pass through an effective portion of said first electrode; a first chamber positioned on one side of said first electrode; a second chamber positioned on an opposite side of said first electrode from said first chamber; first inlet means in fluid communication with said first chamber for permitting a fluid to be supplied thereto; first outlet means in fluid communication with said second chamber for permitting a fluid to be discharged therefrom; means for flowing fluids from said first inlet means to said first outlet means through said electrode in a first direction; second inlet means in fluid communication with said second chamber for permitting fluid to be supplied thereto; second outlet means in fluid communication with said first chamber for permitting fluid to be discharged therefrom; and means for flowing fluid from said second inlet means to said second outlet means through said first electrode in a second direction opposite said first direction upon the termination of fluid flow in said first direction.

2. Apparatus according to claim 1, wherein said first inlet means and said first outlet means are formed in said supporting means.

3. Apparatus according to claim 1, wherein said supporting means is a frame having a polygonal shape, said first and second inlet means being formed in one side of said frame and said first and second outlet means being formed in another side of said frame.

4. Apparatus according to claim 3, wherein said one side of said frame is generally opposite said another side of said frame.

5. Apparatus according to claim 4, wherein said frame includes connecting means for electrically connecting said first elecrode to a first electrical conductor extending outwardly from said frame.

6. Apparatus according to claim 5, wherein said connecting means is a second electrical conductor.

7. Apparatus according to claim 6, wherein said second electrical conductor is embedded in said frame.

8. Apparatus according to claim 7, wherein said edges of said first electrode are embedded in said frame.

9. Apparatus according to claim 1, further comprising a second electrode positioned on one side of said first electrode such that said first chamber lies between said first and second electrodes and a third electrode positioned on an opposite side of said first electrode from said second electrode such that said second chamber lies between said first and third electrodes.

10. Apparatus according to claim 9, further comprising first diaphragm means, disposed between said first and second electrodes such that said first diaphragm means cooperates with said first electrode to delimit said first chamber and with said second electrode to delimit a third chamber, for inhibiting mixture of fluid in said first chamber with fluid in said third chamber and permitting passage of certain ionic species between fluid in said first chamber and fluid in said third chamber and second diaphragm means, disposed between said first and third electrodes such that said second diaphragm means cooperates with said first electrode to delimit said second chamber and with said third electrode to delimit a fourth chamber, for inhibiting mixture of fluid in said second chamber with fluid in said fourth chamber and permitting passage of certain ionic species between fluid in said second chamber and fluid in said fourth chamber.

11. Apparatus according to claim 10, further comprising third inlet means in fluid communication with said third chamber for permitting fluid to be supplied thereto and fourth inlet means in fluid communication with said fourth chamber for permitting fluid to be supplied thereto.

12. Apparatus according to claim 11, further comprising third outlet means in fluid communication with said third chamber for permitting fluid to be discharged therefrom and fourth outlet means in fluid communication with said fourth chamber for permitting fluid to be discharged therefrom.

13. Apparatus according to claim 12, further comprising first gasket means sandwiched between said first electrode and said first diaphragm means for providing a fluid-tight seal therebetween, second gasket means sandwiched between said second electrode and said first diaphragm means for providing a fluid-tight seal therebetween, third gasket means sandwiched between said first electrode and said second diaphragm means for providing a fluid-tight seal therebetween, and fourth gasket means sandwiched between said third electrode and said second diaphragm means for providing a fluid-tight seal therebetween.

14. Apparatus according to claim 13, wherein said third inlet means and said third outlet means are formed in said second gasket means and said fourth inlet means and said fourth outlet means are formed in said fourth gasket means.

15. Apparatus according to claim 13, wherein said first electrode includes a pair of primary electrode components and a secondary electrode component disposed between said primary electrode components.

16. Apparatus according to claim 15, further comprising first pressing means urged into engagement with one of said primary electrode components by said first gasket means for pressing said one primary electrode component against said secondary electrode component and second pressing means urged into engagement with the other of said primary electrode components by said third gasket means for pressing said other primary electrode component against said secondary electrode component.

17. Apparatus according to claim 16, further comprising first fluid flow path means in fluid communication with said first inlet means for permitting fluid to flow through said supporting means, said second and third electrodes, and said first, second, third, and fourth gaskets.

18. Apparatus according to claim 17, further comprising second fluid flow path means in fluid communication with said first outlet means for permitting fluid to flow through said supporting means, said second and third electrodes, and said first, second, third, and fourth gaskets.

19. Apparatus according to claim 18, further comprising third fluid flow path means in fluid communication with said second inlet means for permitting fluid to flow through said supporting means, said second and third electrodes, and said first, second, third, and fourth gaskets.

20. Apparatus according to claim 19, further comprising fourth fluid flow path means in fluid communication with said second outlet means for permitting fluid to flow through said supporting means, said second and third electrodes, and said first, second, third, and fourth gaskets.

21. Apparatus according to claim 20, further comprising fifth fluid flow path means in fluid communication with said third and fourth inlet means for permitting fluid to flow through said supporting means, said second and third electrodes, and said first, second, third, and fourth gaskets.

22. Apparatus according to claim 21, further comprising sixth fluid flow path means in fluid communication with said third and fourth outlet means for permitting fluid to flow through said supporting means, said second and third electrodes, and said first, second, third, and fourth gaskets.

23. Apparatus according to claim 1, wherein said first electrode is a thin porous electrode having a substantially uniform pore distribution which is substantially unchanged by fluid flow through said first electrode.

24. Apparatus according to claim 23, wherein approximately 80% of all pores in said first electrode have a pore size within a range of from about 1 micrometer to about 100 micrometers.

25. Apparatus according to claim 23, wherein said first electrode has a thickness in a range of from about $\frac{1}{4}$ millimeter to about 15 millimeters.

26. Apparatus according to claim 23, wherein said first electrode has a thickness in a range of from about 1 millimeter to about 2 millimeters.

27. Apparatus according to claim 23, wherein said first electrode is substantially planar.

28. Apparatus according to claim 23, wherein said supporting means includes connecting means for electrically connecting said electrode to an external source of electrical current.

29. Apparatus according to claim 28, wherein said connecting means is embedded in said supporting means.

30. Apparatus according to claim 29, wherein said supporting means is a frame surrounding said first electrode, said edges of said first electrode being embedded in said frame.

31. Apparatus according to claim 23, wherein said first electrode includes at least one porous primary electrode component, having electrically conductive surfaces, and a porous secondary electrode component supporting said at least one primary electrode component and facilitating uniform distribution of electric current within said at least one primary electrode component.

32. Apparatus according to claim 31, wherein said secondary electrode component is made from a metal selected from the group consisting of titanium, tantalum, tungsten, niobium, hafnium, and alloys thereof.

33. Apparatus according to claim 32, wherein said at least one primary electrode section is made from carbon fibers.

34. Apparatus according to claim 31, further comprising holding means for holding said at least one primary electrode component in contact with said secondary electrode component.

35. Apparatus according to claim 34, wherein said holding means includes a plurality of titanium staples.

36. Apparatus according to claim 31, wherein said at least one primary electrode component includes a pair of primary electrode components, one of said pair of primary electrode components being disposed on one side of said secondary electrode component and the other of said pair of primary electrode components being disposed on an opposite side of said secondary electrode component, each of said primary electrode components including a porous electrically conductive material in electrical contact with said secondary electrode component.

37. Apparatus according to claim 36, wherein each of said primary electrode components has a thickness in a range of from about 0.1 millimeter to about 10 millimeters.

38. Apparatus according to claim 37, wherein said secondary electrode component has a thickness of about 1 millimeter.

39. Apparatus according to claim 36, wherein said secondary electrode component has a surface comprising a metal selected from the group consisting of titanium, tantalum, tungsten, niobium, hafnium, and alloys thereof.

40. Apparatus according to claim 39, wherein said secondary electrode component has a surface made from titanium.

41. Apparatus according to claim 40, wherein said porous conductive material comprises carbon fibers.

42. Apparatus according to claim 41, wherein said porous conductive material has a surface area to volume ratio of greater than about 100 centimeters $^2$/centimeters$^3$.

43. Apparatus according to claim 42, wherein approximately 80% of all pores in said porous conductive material are in a range of from about 1 micrometer to about 100 micrometers.

44. Apparatus according to claim 41, wherein said carbon fibers are in the form of a mesh.

45. Apparatus according to claim 41, wherein said carbon fibers are in the form of a cloth.

46. A reactor usable in the electrolytic treatment of electroactive species in a solution, comprising a plurality of cells, each of said cells including a first electrode which is fluid permeable, a second electrode positioned on one side of said first electrode, a third electrode positioned on the other side of said first electrode, supporting means surrounding all edges of said first electrode for supporting said first electrode across a fluid flow path and sealing said edges so that fluid flowing along said flow path must pass through an effective portion of said first electrode, a first diaphragm interposed between said first and second electrodes, a second diaphragm interposed between said first and third electrodes, a first chamber formed between said first electrode and said first diaphragm, a second chamber formed between said second diaphragm and said first electrode, a third chamber formed between said second electrode and said first diaphragm, and a fourth chamber formed between said second diaphragm and said third electrode; first supply means for permitting a first fluid to be supplied to the reactor; second supply means for permitting a second fluid to be supplied to the reactor; third supply means for permitting a third fluid to be supplied to the reactor; first discharge means for permitting a first fluid to be discharged from the reactor; second discharge means for permitting a second fluid to be discharged from the reactor; third discharge means for permitting a third fluid to be discharged from the reactor; first communicating means for providing fluid communication between said first supply means, said first chamber of each of said cells, said second chamber of each of said cells, and said first discharge means; second communicating means for providing fluid communication between said second supply means, said third chamber of each of said cells, said fourth chamber of each of said cells, and said second discharge means; and third communicating means for providing fluid communication between said third supply means, said first chamber of each of said cells, said second chamber of each of said cells, and said third discharge means.

47. A reactor according to claim 46, wherein each of said first electrodes operates normally as a cathode and each of said second and third electrodes operates normally as an anode.

48. A reactor according to claim 47, further comprising means for selectively changing the polarity of each of said first, second and third electrodes, whereby each of said first electrodes can operate as an anode, rather than a cathode, and each of said second and third electrodes can operate as a cathode, rather than an anode.

49. A reactor according to claim 48, further comprising first transporting means for transporting waste water through said first supply means, said first chamber of each of said cells, said second chamber of each of said cells, and said first discharge means; second transporting means for transporting anolyte through said second supply means, said third chamber of each of said cells, said fourth chamber of each of said cells, and said second discharge means; and third transporting means for transporting electrolyte through said third supply means, said first chamber of each of said cells, said second chamber of each of said cells, and said third discharge means.

50. A reactor according to claim 49, further comprising first control means for controlling the flow of waste water so as to prevent the flow thereof when electrolyte is flowing through the reactor.

51. A reactor according to claim 50, further comprising second control means for controlling the flow of electrolyte so as to prevent the flow thereof when waste water is flowing through the reactor.

52. A reactor according to claim 51, wherein waste water flows through said first electrode of each of said cells in a first direction and electrolyte flows through said first electrode of each of said cells in a second direction opposite said first direction.

53. A reactor according to claim 46, wherein said cells are arranged seriatim.

54. A reactor according to claim 53, wherein at least one of said second and third electrodes of each of said cells forms one of said second and third electrodes of an adjacent cell.

* * * * *